No. 692,881. Patented Feb. 11, 1902.
R. F. LINDSAY.
PIPE UNION.
(Application filed Feb. 25, 1901.)
(No Model.)
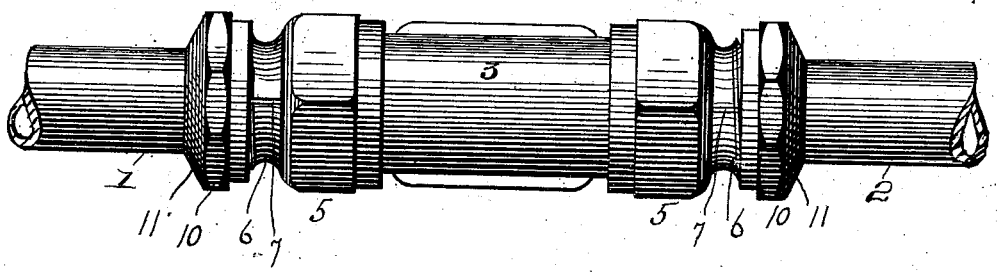
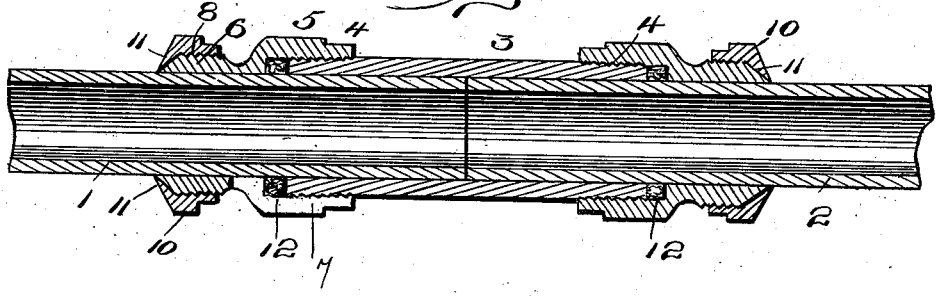
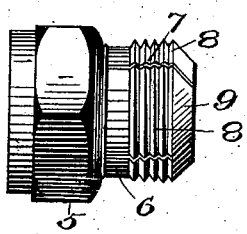 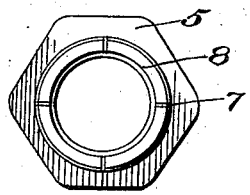
Witnesses:
Inventor
Robert F. Lindsay
By C. J. Stockman
Atty.

UNITED STATES PATENT OFFICE.

ROBERT F. LINDSAY, OF GREENVILLE, SOUTH CAROLINA, ASSIGNOR TO SAMUEL C. KOONCE, OF CLARKSVILLE, PENNSYLVANIA, AND JOHN S. LESLIE, OF SHARON, PENNSYLVANIA.

PIPE-UNION.

SPECIFICATION forming part of Letters Patent No. 692,881, dated February 11, 1902.

Application filed February 25, 1901. Serial No. 48,785. (No model.)

*To all whom it may concern:*

Be it known that I, ROBERT F. LINDSAY, a citizen of the United States, residing at Greenville, in the county of Greenville and State of South Carolina, have invented certain new and useful Improvements in Pipe-Unions; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to that type of detachable pipe couplings or unions hitherto proposed for water-pipes which embrace a sleeve into which the confronting ends of the pipes are inserted, a cone encircling each pipe end, and nuts having threaded engagement with the sleeve and bearing upon said cones to thereby hold the pipes in position.

Hitherto the construction and arrangement of the parts named have been such that the pressure exerted upon the pipes by the coupling has been imposed on the ends thereof. It has been demonstrated that such constructions are wholly unreliable in action, for the reason that the tendency of the pipes to pull apart under the influence of vibration due to the flowing of water under pressure therethrough and by contraction of the pipes in cold weather and settling of the building is not successfully resisted when the confronting parts of the pipes are gripped.

The principal object of the present invention is to overcome this disadvantage by simple, inexpensive, and thoroughly practical means, and this object is accomplished by reorganizing and reconstructing the parts so that the coupling will grip the respective ends of the pipe at a distance from each other and at a distance from the extremities of the pipe without necessitating an undue increase in the length of the sleeve or requiring a threaded engagement of the sleeve and pipe, which engagement reduces but does not obviate the tendency to disconnection of the parts. Other objects and advantages will appear from the following description.

In the accompanying drawings, illustrating the invention, and wherein similar numerals of reference designate similar parts in the several views, Figure 1 is a side elevation of a pipe-union constructed in accordance with my invention. Fig. 2 is a longitudinal sectional view thereof. Fig. 3 is a side view of a split gland forming a part of the union. Fig. 4 is an end view of said gland.

The two confronting ends of the pipes which are to be detachably united together are designated by the numerals 1 and 2, and 3 designates the sleeve into which said confronting ends are slipped. It will be observed that the bore of the sleeve is of a diameter approximately the same as the external diameter of the pipe ends, whereby said sleeve fits snugly upon said pipe ends throughout its entire length. Each end of said sleeve is threaded externally for engagement with the internally-threaded widened end of a gland 5, which has an outward extension 6, that also fits snugly upon the pipe, (having a bore of substantially the diameter of the latter,) and said outward extension 6 is split longitudinally at suitable places, as shown at 7, to give it resilience and is formed with external threads 8 and with a conical extremity 9, through which the slits 7 extend. This extension thus constitutes a compressible device adapted to be gripped tightly upon the pipe end to thereby hold the parts in place. An internally-threaded nut 10, forming part of a compressible grip means, of which said extension forms the other part, engages said threads 8 and compresses said extension 6 tightly upon the pipe therein. Said nut has a beveled inner end wall 11 to engage the conical end 9 of the extension 6. The widened end of the gland 5 is of such length as to provide a space within the gland and at the end of the sleeve 3 for a packing-ring 12.

By the construction described the grip of the union upon the respective pipes will be at a distance from the extremities of said pipes and, as proved by practice, will resist the tendency to separation of the pipe ends by the causes above mentioned. Moreover, as the sleeve fits snugly upon the pipe ends a perfect alinement of said ends is at all times assured, and in addition thereto it will be seen that the relative construction and location of the parts are such as to render it wholly unnecessary to resort to threaded engagement of the pipe ends with the sleeve to secure satisfactory connection thereof, and by this means and otherwise the expense, labor, and difficulty of proper assemblage of the parts are reduced to a minimum.

Having thus described the invention, what I believe to be new, and desire to secure by Letters Patent, is—

1. A detachable coupling or union for water-pipes, comprising a sleeve having a bore of a diameter approximately the same as that of the pipe ends which it is designed to embrace and having its end threaded externally, a gland having internal threads to engage the threaded end of said sleeve, said gland having an externally-threaded and longitudinally-slitted extension formed with a bore of a diameter approximately the same as that of said pipe ends, and a nut threaded upon said extension.

2. A detachable coupling or union for water-pipes, comprising a sleeve having a bore of a diameter approximately the same as that of the pipe ends which it is designed to embrace, and having its ends threaded externally, glands having internal threads to engage the threaded ends of said sleeve, said glands being formed to provide confined spaces outside the ends of the sleeve, packing in said spaces, extensions from said glands having bores of a diameter approximately the same as that of said pipe ends, said extensions being slitted longitudinally and having conical free ends, and nuts threaded upon said extensions and having beveled walls to engage said conical ends.

In testimony whereof I affix my signature in presence of two witnesses.

ROBERT F. LINDSAY.

Witnesses:
J. L. MERRITT,
W. O. ESTES.